(12) United States Patent
Drappel et al.

(10) Patent No.: US 6,878,198 B1
(45) Date of Patent: Apr. 12, 2005

(54) PHASE CHANGE INKS AND PROCESS FOR THE PREPARATION THEREOF

(75) Inventors: Stephan V. Drappel, Toronto (CA); Marcel P. Breton, Mississauga (CA); James D. Mayo, Mississauga (CA); Raymond W. Wong, Mississauga (CA); Christine E. Bedford, Burlington (CA); Danielle C. Boils-Boissier, Mississauga (CA); Sandra J. Gardner, Oakville (CA); Paul F. Smith, Oakville (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/722,164

(22) Filed: Nov. 25, 2003

(51) Int. Cl.$^7$ ............................................. C09D 11/00
(52) U.S. Cl. ............................... 106/31.86; 106/31.75; 106/31.61
(58) Field of Search ........................... 106/31.86, 31.75

(56) References Cited

U.S. PATENT DOCUMENTS

| | | | |
|---|---|---|---|
| 3,653,932 A | 4/1972 | Berry et al. ................ 106/22 |
| 4,390,369 A | 6/1983 | Merritt et al. ............... 106/31 |
| 4,484,948 A | 11/1984 | Merritt et al. ............... 106/31 |
| 4,684,956 A | 8/1987 | Ball ........................... 346/1.1 |
| 4,851,045 A | 7/1989 | Taniguchi ................... 106/31 |
| 4,889,560 A | 12/1989 | Jaeger et al. ................ 106/27 |
| 4,889,761 A | 12/1989 | Titterington et al. ........ 428/195 |
| 5,006,170 A | 4/1991 | Schwarz et al. ............. 106/20 |
| 5,151,120 A | 9/1992 | You et al. .................... 106/27 |
| 5,221,335 A | 6/1993 | Williams et al. ............. 106/23 |
| 5,372,852 A | 12/1994 | Titterington et al. ........ 427/288 |
| 5,496,879 A | 3/1996 | Griebel et al. .............. 524/320 |
| 5,621,022 A | 4/1997 | Jaeger et al. ................ 523/161 |
| 5,720,802 A | 2/1998 | Wong et al. ............... 106/31.65 |
| 5,782,966 A | 7/1998 | Bui et al. .................. 106/31.43 |
| 5,800,600 A | 9/1998 | Lima-Marques et al. 106/31.29 |
| 5,902,841 A | 5/1999 | Jaeger et al. ................ 523/161 |
| 5,994,453 A | 11/1999 | Banning et al. ............. 524/590 |
| 6,007,610 A * | 12/1999 | Matzinger et al. ......... 106/14.05 |
| 6,057,399 A * | 5/2000 | King et al. ................. 524/590 |
| 6,174,937 B1 | 1/2001 | Banning et al. ............. 523/160 |
| 6,309,453 B1 | 10/2001 | Banning et al. .......... 106/31.29 |
| 6,336,965 B1 * | 1/2002 | Johnson et al. ............. 106/31.6 |
| 6,380,423 B1 | 4/2002 | Banning et al. ............. 560/158 |
| 6,432,194 B1 * | 8/2002 | Johnson et al. ............. 106/499 |
| 6,478,863 B1 * | 11/2002 | Johnson et al. ............. 106/31.6 |
| 6,494,943 B1 * | 12/2002 | Yu et al. .................. 106/31.65 |
| 6,506,245 B1 * | 1/2003 | Kinney et al. .............. 106/493 |

FOREIGN PATENT DOCUMENTS

| | | |
|---|---|---|
| EP | 0187352 | 7/1986 |
| EP | 0206286 | 12/1986 |
| WO | WO 94/04619 | 3/1994 |

OTHER PUBLICATIONS

Copending U.S. Appl. No. 10/722,162, filed concurrently herewith, entitled "Phase Change Inks," by Raymond W. Wong, et al.
Copending U.S. Appl. No. 10/721,851, filed concurrently herewith, entitled "Processes for Preparing Phase Change Inks," by Raymond W. Wong, et al.
German Patent Publication DE 4205636AL, Aug. 1993.
German Patent Publication DE 4205713AL, Mar. 1996.

* cited by examiner

Primary Examiner—David Sample
Assistant Examiner—Veronica F. Faison
(74) Attorney, Agent, or Firm—Judith L. Byorick

(57) ABSTRACT

Phase change ink compositions comprising (a) an ink carrier comprising a monoamide and a tetra-amide, and (b) pigment particles having oxygen-containing functional groups on the surfaces thereof. Also, processes for preparing a phase change ink which comprise (a) melting a tetra-amide which is solid at about 25° C.; (b) admixing with the molten tetra-amide pigment particles having oxygen-containing functional groups on the surfaces thereof; (c) maintaining the mixture of pigment and tetra-amide at a temperature of at least about 100° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide; (e) subsequent to addition of the monoamide, subjecting the resulting mixture to high shear mixing; and (f) subsequent to subjecting the mixture to high shear mixing, optionally adding to the mixture additional ink ingredients.

72 Claims, No Drawings

PHASE CHANGE INKS AND PROCESS FOR THE PREPARATION THEREOF

Cross-reference is hereby made to the following copending applications:

Copending application U.S. Ser. No. 10/722,162, filed concurrently herewith, entitled "Phase Change Inks," with the named inventors Raymond W. Wong. Stephan V. Droppel, Paul F. Smith, C. Geoffrey Allen, and Caroline M. Turek, the disclosure of which is totally incorporated herein by reference, discloses an ink composition comprising (a) an ink carrier which comprises a monoamide, a tetra-amide, or a mixture thereof; (b) a polyalkylene succinimide; and (c) pigment particles. Also disclosed is an ink composition comprising (a) an ink carrier, (b) a polyalkylene succinimide, and (c) pigment particles, said ink having a conductivity greater than $1 \times 10^8$ Siemens per centimeter. Also disclosed is an ink set comprising (1) a first ink comprising (a) an ink carrier, (b) a polyalkylene succinimide, and (c) pigment particles, and (2) a second ink comprising a dye colorant and a second ink carrier, wherein the first ink carrier contains substantially the same components as the second ink carrier.

Copending application U.S. Ser. No. 10/721,851, filed concurrently herewith, entitled "Processes for Preparing Phase Change Inks," with the named inventors Raymond W. Wong, Hadi K. Mahabadi, Paul F. Smith, Sheau Van Kao, Michael S. Hawkins, and Caroline M. Turek the disclosure of which is totally incorporated herein by reference, discloses a process for preparing a phase change ink composition which comprises (a) a phase change ink carrier, said carrier comprising at least one nonpolar component and at least one polar component, and (b) pigment particles, said process comprising (1) selecting at least one of the polar carrier components to be a pigment particle dispersant, (2) admixing the pigment particles with the dispersant, (3) extruding the mixture of pigment particles and dispersant in an extruder at a temperature that is at or above about the peak crystallization temperature of the dispersant and below about the peak melting temperature of the dispersant, thereby forming a pigment dispersion (4) subsequent to extrusion of the pigment dispersion, adding to the pigment dispersion any remaining polar components and the nonpolar component; and (5) subjecting the resulting mixture of pigment dispersion, polar component, and nonpolar component to high shear mixing to form an ink.

BACKGROUND

Disclosed herein are phase change inks and methods for preparing them. More specifically, disclosed herein are phase change inks containing tetra-amide and monoamide components in the ink carrier and pigment colorants and to processes for preparing such inks. One embodiment is directed to a phase change ink composition comprising (a) an ink carrier comprising a monoamide and a tetra-amide, and (b) pigment particles having oxygen-containing functional groups on the surfaces thereof. Another embodiment is directed to a process for preparing a phase change ink which comprises (a) melting a tetra-amide which is solid at about 25° C.; (b) admixing with the molten tetra-amide pigment particles having oxygen-containing functional groups on the surfaces thereof; (c) maintaining the mixture of pigment and tetra-amide at a temperature of at least about 100° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide: (e) subsequent to addition of the monoamide, subjecting the resulting mixture to high shear mixing; and (f) subsequent to subjecting the mixture to high shear mixing, optionally adding to the mixture additional ink ingredients. Yet another embodiment is directed to a phase change ink set comprising (1) a first phase change ink comprising pigment particles having oxygen-containing functional groups on the surfaces thereof and a first ink carrier comprising a monoamide and a tetra-amide, and (2) a second phase change ink comprising a dye colorant and a second ink carrier comprising the monoamide, the tetra-amide, wherein the first ink carrier contains substantially the same components as the second ink carrier.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 4,889,560 (Jaeger et al.), the disclosure of which is totally incorporated herein by reference, discloses a phase change ink carrier composition combined with a compatible colorant to form a phase change ink composition. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

U.S. Pat. No. 4,889,761 (Titterington et al.), the disclosure of which is totally incorporated herein by reference, discloses a method for producing a light-transmissive phase change ink printed substrate is described which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path. In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

U.S. Pat. No. 5,372,852 (Titterington et al.), the disclosure of which is totally incorporated herein by reference, discloses a phase change ink composition that is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet printhead, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

U.S. Pat. No. 5,994,453 (Banning et al.), the disclosure of which is totally incorporated herein by reference, discloses phase change carrier compositions made from the combination of at least one urethane resin; at least one urethane/urea resin: at least one mono-amide, and at least one polyethylene wax. The order of addition of the reactants to form the reactant product urethane resin and urethane/urea resin permits the tailoring or design engineering of desired properties.

U.S. Pat. No. 6,174,937 (Banning et al.), the disclosure of which is totally incorporated herein by reference, discloses a phase change ink comprising a material of the formula

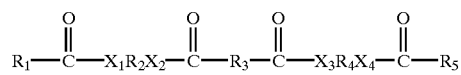

wherein $X_1$, $X_2$, $X_3$, and $X_4$ are segments comprising atoms selected from groups V and VI of the periodic table: wherein at least one $R_1$ and $R_5$ comprises at least 37 carbon units; and wherein $R_2$, $R_3$, and $R_4$ each comprise at least one carbon unit. The invention further encompasses a composition of matter, as well as methods of reducing coefficients of friction of phase change ink formulations.

U.S. Pat. No. 6,309,453 (Banning et al.), the disclosure of which is totally incorporated herein by reference, discloses colorless compounds having a central core and at least two arms extending from the core. The core can comprise one or more atoms. The at least two arms have the formula

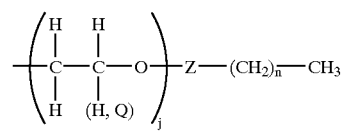

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula

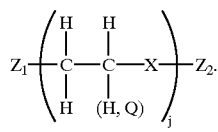

In such formula, X is a single atom corresponding to N or O: $Z_1$ and $Z_2$ are substituents comprising one or more atoms, and can be the same as one another or different from one another; and j is an integer from 1 to about 50.

U.S. Pat. No. 6,380,423 (Banning et al.), the disclosure of which is totally incorporated herein by reference, discloses colorless compounds having a central core and at least two arms extending from the core. The core can comprise one or more atoms. The at least two arms have the formula

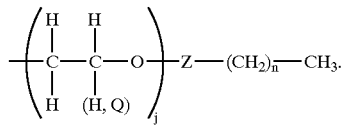

In such formula, Z is a segment of one or more atoms: j is an integer from 1 to about 300 and can be different at one of the at least two arms than at another of the at least two arms: Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula

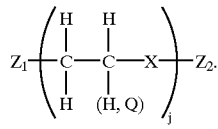

In such formula, X is a single atom corresponding to N or O: $Z_1$ and $Z_2$ are substituents comprising one or more atoms, and can be the some as one another or different from one another; and j is an integer from 1 to about 50.

U.S. Pat. No. 5,221,335 (Williams et al.), the disclosure of which is totally incorporated herein by reference, discloses a stabilized pigmented hot melt ink containing a thermoplastic vehicle, a coloring pigment, and a dispersion-stabilizing agent to inhibit settling or agglomeration of the pigment when the ink is molten, comprising 1.5 to 20 weight percent of a nitrogen-modified acrylate polymer. A preferred dispersion-stabilizing agent is the nitrogen-modified methacrylate polymer marketed by Rohm and Haas as Plexol 1525.

U.S. Pat. No. 5,800,600 (Lima-Marquez et al.), the disclosure of which is totally incorporated herein by reference, discloses a solid ink jet ink composition which is suitable for hot melt applications having a carrier having an electrical resistivity of at least $10^8$ Ohm·cm, insoluble marking particles, and a particle charging agent dispersed in it. The marking particle may be a pigment, an insoluble dyestuff, a polymer, or mixture thereof. The particle charging agent may be a metal soap, a fatty acid, lecithin, an organic phosphorous compound, a succinimide, a sulfosuccinate, petroleum sulfonates, a soluble or partially soluble resin such as a modified rosin ester, an acrylic, a vinyl, a hydrocarbon, or a mixture thereof. The solid ink jet ink composition may further include a viscosity controller. The ink may be capable of being heated to 155° C. and hove at that temperature a viscosity of between 5 to 150 centipoise.

While known compositions and processes are suitable for their intended purposes, a need remains for improved phase change inks. In addition, a need remains for phase change inks having pigment colorants. Further, a need remains for phase change inks having pigment colorants wherein the pigment particles are stable and uniformly dispersed within the ink formulation. Additionally, a need remains for phase change inks having pigment colorants wherein no surfactants, dispersing agents, or other additives are necessary to stabilize or to disperse uniformly the pigment particles within the ink formulation. There is also a need for ink sets of different colored inks wherein some inks have pigment colorants and some inks have dye colorants, and wherein the other ink components remain the same for both the pigment-based inks and the dye-based inks. In addition, there is a need for phase change inks containing pigment colorants that have increased stability and lightfastness at elevated temperatures, thereby enabling improved fade resistance upon exposure to heat and/or light. Further, there is a need for phase change inks containing pigment colorants that exhibit reduced diffusion of the colorant from the ink to paper, thereby enabling reduced showthrough. Additionally, there is a need for phase change inks containing pigment colorants that exhibit reduced diffusion of colorants from image areas of one color to image areas of another color, thereby enabling improved image quality.

SUMMARY

Disclosed herein is a phase change ink composition comprising (a) an ink carrier comprising a monoamide and a tetra-amide, and (b) pigment particles having oxygen-containing functional groups on the surfaces thereof. Also disclosed herein is a process for preparing a phase change ink which comprises (a) melting a tetra-amide which is solid at about 25° C.; (b) admixing with the molten tetra-amide pigment particles having oxygen-containing functional groups on the surfaces thereof; (c) maintaining the mixture of pigment and tetra-amide at a temperature of at least about 10° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide; (e) subsequent to addition of the monoamide, subjecting the resulting mixture to high shear mixing; and (f) subsequent to subjecting the mixture to high shear mixing, optionally adding to the mixture additional ink ingredients. Also disclosed herein is a phase change ink set comprising (1) a first phase change ink comprising pigment particles having oxygen-containing functional groups on the surfaces thereof and a first ink carrier comprising a monoamide and a tetra-amide, and (2) a second phase change ink comprising a dye colorant and a second ink carrier comprising the monoamide, the tetra-amide, wherein the first ink carrier contains substantially the same components as the second ink carrier.

DETAILED DESCRIPTION

The phase change inks comprise a monoamide, a tetra-amide, and pigment particles having oxygen-containing functional groups on the surfaces thereof.

Suitable monoamides include both solid and liquid monoamides, provided that the ink containing the mixture of all ingredients is solid at room temperature (typically from about 20 to about 25° C.). In one specific embodiment, the monoamide has a melting point of at least about 50° C., although the melting point can be below this temperature. In another specific embodiment, the monoamide has a melting point of no more than about 100° C. although the melting point can be above this temperature. Some specific examples of suitable monoamides include (but are not limited to) primary monoamides and secondary monoamides. Stearamide, such as KEMAMIDE S available from Witco Chemical Company and CRODAMIDE S available from Croda, behenamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. In one specific embodiment, the monoamide is of the formula

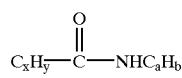

wherein x is an integer of from about 5 to about 21, y is an integer of from about 11 to about 43, a is an integer of from about 6 to about 22, and b is an integer of from about 13 to about 45. Mixtures of two or more monoamides can also be employed.

The monoamide is present in the ink carrier in any desired or effective amount. In one embodiment at least about 8 percent by weight, in another embodiment at least about 10 percent by weight, and in yet another embodiment at least about 12 percent by weight, and in one embodiment no more than about 70 percent by weight, in another embodiment no more than about 60 percent by weight, in yet another embodiment no more than about 50 percent by weight, in still another embodiment no more than about 32 percent by weight, in another embodiment no more than about 28 percent by weight, and in yet another embodiment no more than about 25 percent by weight, although the amount can be outside of these ranges.

Suitable tetra-amides include both solid and liquid tetra-amides, provided that the ink containing the mixture of all ingredients is solid at room temperature (typically from about 20 to about 25° C.). One specific class of suitable tetra-amides is that encompassed by the formula

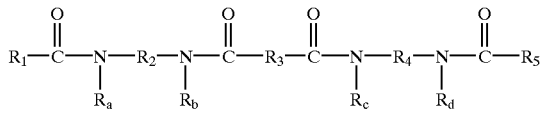

wherein $R_a$, $R_b$, $R_c$, and $R_d$ each, independently of the others, is (a) a hydrogen atom, (b) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, and in still another embodiment with at least about 8 carbon atoms, and in one embodiment with no more than about 100 carbon atoms, and in another embodiment with no more than about 50 carbon atoms, although the number of carbon atoms can be outside of these ranges, (c) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 100 carbon atoms, and in another embodiment with no more than about 50 carbon atoms, although the number of carbon atoms can be outside of these ranges, (d) an arylalkyl group (including unsubstituted and substituted arylolkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms con be outside of these ranges, such as benzyl or the like, or (e) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 100 carbon atoms, and in another embodiment with no more than about 50 carbon atoms, although the number of carbon atoms can be outside of these ranges, such as tolyl or the like, wherein $R_2$, $R_3$, and $R_4$ each. Independently of the others, are (a) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms. In yet another embodiment with at least about 4 carbon atoms, and in still another embodiment with at least about 8 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (b) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, (c) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, or (d) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group). In one embodiment with at least about 6 carbon atoms, and in another embodiment with at least about 7 carbon atoms, and in one embodiment with no more than about 100 carbon atoms, in another embodiment with no more than about 50 carbon atoms, and in yet another embodiment with no more than about 12 carbon atoms, although the number of carbon atoms can be outside of these ranges, and wherein $R_1$ and $R_5$ each, independently of the other. Is (a) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 4 carbon atoms, in still another embodiment with at least about 8 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (b) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, (c) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in another embodiment with at least about 12 carbon atoms, in yet another embodiment with at least about 18 carbon atoms, in still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as benzyl or the like, or (d) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in another embodiment with at least about 12 carbon atoms, in yet another embodiment with at least about 18 carbon atoms. In still another embodiment with at least about 37 carbon atoms, in another embodiment with at least about 40 carbon atoms, and in yet another embodiment with at least about 48 carbon atoms, and in one embodiment with no more than about 100 carbon atoms, and in another embodiment with no more than about 50 carbon atoms, although the number of carbon atoms can be outside of these ranges, such as tolyl or the like, wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylic acid groups, mixtures thereof, and the like, wherein two or more substituents can be joined together to form a ring. In one specific embodiment, one or both of $R_1$ and $R_5$ are alkyl groups with about 18 carbon atoms. In another specific embodiment, one or both of $R_1$ and $R_5$ are alkyl groups with at least about 37 carbon atoms. In yet another specific embodiment, one or both of $R_1$ and $R_5$ are alkyl groups with about 48 carbon atoms. In still another specific embodiment, $R_1$ and $R_5$ are both —$(CH_2)_{16}CH_3$, $R_2$ and $R_4$ are each —$CH_2CH_2$—, and $R_3$ is a branched unsubstituted alkyl group having about 34 carbon atoms. In another specific embodiment, $R_1$ and $R_5$ are both —$(CH_2)_n CH_3$ wherein n is 47 or 48, $R_2$ and $R_4$ are each —$CH_2CH_2$—, and $R_3$ is a branched unsubstituted alkyl group having about 34 carbon atoms.

Some additional specific examples of suitable tetra-amides are disclosed in, for example, U.S. Pat. No. 6,174,937, the disclosure of which is totally incorporated herein by reference.

The tetra-amide is present in the ink carrier in any desired or effective amount, in one embodiment at least about 10 percent by weight, in another embodiment at least about 13 percent by weight, and in yet another embodiment at least about 16 percent by weight, and in one embodiment no more than about 32 percent by weight, in another embodiment no more than about 27 percent by weight, and in yet another embodiment no more than about 22 percent by weight, although the amount can be outside of these ranges.

Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

If desired, the ratio of monoamide to tetra-amide in the ink can be adjusted to control the viscosity of the ink.

Also suitable as components in the phase change ink carrier are isocyanate-derived resins and waxes, such as urethane isocyanate-derived materials, urea isocyanate-derived materials, urethane/urea isocyanate-derived materials, mixtures thereof, and the like. One specific example of a suitable isocyanate-derived material is a urethane resin derived from the reaction of two equivalents of hydroabietyl alcohol and one equivalent of isophorone diisocyanate. Materials of this kind can be prepared as described in, for example, Example 1 of U.S. Pat. No. 5,782,966, the disclosure of which is totally incorporated herein by reference. Another specific example of a suitable isocyanate-derived material is a material that is the adduct of three equivalents of stearyl isocyanate and a glycerol propoxylate such as ARCOL® LHT. Materials of this kind can be prepared as described in, for example, Example 4 of U.S. Pat. No. 6,309,453, the disclosure of which is totally incorporated herein by reference. Yet another specific example of a suitable isocyanate-derived material is a material that is the product of the reaction of about 1.5 parts hydroabietyl alcohol, about 0.5 part octadecyl amine, and about 1 part isophorone diisocyanate. Materials of this kind can be prepared as described in, for example, Example 2 of U.S. Pat. No. 5,782,966, the disclosure of which is totally incorporated herein by reference. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such os ethylene/vinyl acetate copolymers, ethylene/acrylic acid copolymers, ethylene/vinyl acetate/acrylic acid copolymers, copolymers of acrylic acid with polyamides, and the like, copolymers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the carrier in an amount in one embodiment of at least about 25 percent by weight, in another embodiment of at least about 30 percent by weight, and in yet another embodiment of at least about 37 percent by weight, and in one embodiment of no more than about 60 percent by weight, in another embodiment of no more than about 53 percent by weight, and in yet another embodiment of no more than about 48 percent by weight, although the amount can be outside of these ranges; (b) a stearyl stearamide wax, present in the carrier in an amount in one embodiment of at least about 8 percent by weight, in another embodiment of at least about 10 percent by weight, and in yet another embodiment of at least about 12 percent by weight, and in one embodiment of no more than about 32 percent by weight, in another embodiment of no more than about 28 percent by weight, and in yet another embodiment of no more than about 25 percent by weight, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the carrier in an amount in one embodiment of at least about 10 percent by weight, in another embodiment of at least about 13 percent by weight, and in yet another embodiment of at least about 16 percent by weight, and in one embodiment of no more than about 32 percent by weight, in another embodiment of no more than about 27 percent by weight, and in yet another embodiment of no more than about 22 percent by weight, although the amount can be outside of these ranges: (d) a urethane resin derived from the reaction of two equivalents of hydroabietyl alcohol and one equivalent of isophorone diisocyanate, present in the carrier in an amount in one embodiment of at least about 6 percent by weight, in another embodiment of at least about 8 percent by weight, and in yet another embodiment of at least about 10 percent by weight, and in one embodiment of no more than about 16 percent by weight, in another embodiment of no more than about 14 percent by weight, and in yet another embodiment of no more than about 12 percent by weight, although the amount can be outside of these ranges; (e) a urethane resin that is the adduct of three equivalents of stearyl isocyanate and a glycerol-based alcohol, present in the carrier in an amount in one embodiment of at least about 2 percent by weight, in another embodiment of at least about 3 percent by weight, and in yet another embodiment of at least about 4.5 percent by weight, and in one embodiment of no more than about 13 percent by weight, in another embodiment of no more than about 10 percent by weight, and in yet another embodiment of no more than about 7.5 percent by weight, although the amount can be outside of these ranges; and (f) an antioxidant, present in the carrier in an amount in one embodiment of at least about 0.01 percent by weight, in another embodiment of at least about 0.05 percent by weight, and in yet another embodiment of at least about 0.1 percent by weight, and in one embodiment of no more than about 1 percent by weight, in another embodiment of no more than about 0.5 percent by weight, and in yet another embodiment of no more than about 0.3 percent by weight, although the amount can be outside of these ranges.

The ink carrier is present in the phase change ink in any desired or effective amount, in one embodiment of at least about 0.1 percent by weight of the ink, in another embodiment of at least about 50 percent by weight of the ink and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The inks also contain pigment particles having oxygen-containing functional groups on the surfaces thereof. The pigment particles can be of any desired color, including (but not limited to) black, cyan, magenta, yellow, red, blue, green, brown, gold, gray, purple, orange, pink, and the like, as well as mixtures thereof. Any pigment material either having oxygen-containing functional groups thereon or capable of being chemically treated to place oxygen-containing functional groups thereon can be employed. Specific examples of suitable pigments include (but are not limited to) anthraquinones, phthalocyanines, monoazos, diazos, pyranthrones, perylenes, heterocyclics, quinacridones, indigoids, thioindigoids, various carbon blacks, such as furnace black, channel black, thermal black, lamp black, and the like, graphite, vitreous carbon, activated charcoal, carbon fiber, and the like, as well as mixtures thereof.

Examples of suitable oxygen-containing functional groups include both acidic oxygen-containing functional groups and basic oxygen-containing functional groups. Specific examples of suitable oxygen-containing functional groups include carboxylic acid groups, sulfonic acid groups, phosphonic acid groups hydroxyl groups, phenolic hydroxyl groups, quinonic groups, including (but not limited to) those of the general formulae

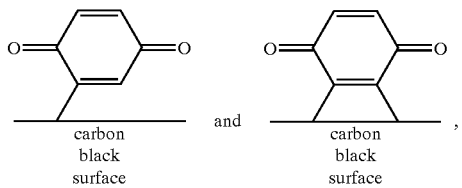

lactonic groups. including (but not limited to) those of the general formula

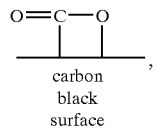

and the like, as well as mixtures thereof.

Groups such as oxygen-containing acidic groups can be placed on the surface of pigment particles by oxidation with materials such as nitric acid or ozone. Pigments having oxygen-containing functional groups on the surface thereof are known. Examples of commercially available pigments suitable for the inks include (but are not limited to) SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Degussa, MOGUL L, REGAL 400R, REGAL 330, and MONARCH 900, available from Cabot Chemical Co., MA77, MA7, MA8, MA11, MA100, MA100R, MA100S, MA230, MA220, MA200RB, MA14, # 2700B, # 2650, # 2600, # 2450B, # 2400B, # 2350, # 2300, # 2200B, # 1000, #970, #3030B, and #3230B, all available from Mitsubishi, RAVEN 2500 ULTRA, Carbon Black 5250, and Carbon Black 5750 available from Columbia Chemical Co., pigments such as those disclosed in U.S. Pat. No. 5,837,045 and U.S. Pat. No. 5,922,118, the disclosures of each of which are totally incorporated herein by reference, and the like, as well as mixtures thereof.

In one specific embodiment, the pigment particles have a primary volume average particle size in one embodiment of no less than about 0.01 micron as measured by electron microscopy according to ASTM 3849, and in one embodiment of no more than about 0.1 micron as measured by electron microscopy according to ASTM 3849, in another embodiment of no more than about 0.08 micron, although the primary particle size can be outside of these ranges. By primary average particle size is meant the size of the primary particles of carbon black present in the ink; these primary particles form aggregates of 2 or more particles when present in the ink. In one specific embodiment, the primary particles form aggregates of at least about 45 cc/100 g, and in another embodiment of at least about 50 cc/100 g, and in one embodiment the primary particles form aggregates of no more than about 200 cc/100 g, and in another embodiment of no more than about 110 cc/100 g, as measured using the dibutyl phthalate oil absorption method according to ASTM D2414. The aggregates in turn can associate with other aggregates to form agglomerates in the ink.

The pigment having oxygen-containing functional groups on the surfaces thereof is present in the phase change ink in any desired or effective amount to obtain the desired color or hue, in one embodiment at least about 0.1 percent by weight of the ink, in another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 10, NAUGUARD® 524, NAUGUARD® 76, NAUGUARD® 512, NAUGUARD® XL-1, and NAUGUARD® HM-22, commercially available from Uniroyal Chemical Company, Oxford, Conn., CGL 545, IRGACOR® 252 FC, IRGANOX® 1010, IRGANOX® 1035, IRGANOX® B 900, IRGANOX® 1330 FF, IRGANOX® MD 1024, IRGANOX® 3114, IRGAROLE 1051, IRGAFOS® 38, IRGAFOS® 168, TINUVIN® 111 FB, TINUVIN® 144, and TINUVIN® 622 FB, commercially available from Ciba Geigy, UVINUL® 3048, commercially available from BASF, and the like, as well as mixtures thereof. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink. In another embodiment of no more than about 5 percent by weight of the ink, and in yet another embodiment of no more than about 3 percent by weight of the ink, although the amount can be outside of these ranges.

The inks can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink and in yet another embodiment of at least about 10 percent by weight of the ink and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical industries, Ltd.), synthetic polyterpene resins such as NEVTAC® 2300, NEVTAC® 100, and NEVTAC® 80 (commercially available from Neville Chemical Company). WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount con be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalote, alkylbenzyl phthalate (SANTICIZER® 278), triphenyl phosphate (commercially available from Monsanto). KP-140®, a tributoxyethyl phosphate (commercially available from FMC Corporation), MORFLEX® 150, a dicyclohexyl phthalate (commercially available from Morflex Chemical Company inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

In one specific embodiment, the inks are prepared by first admixing the molten tetra-amide with the pigment particles having oxygen-containing functional groups on the surfaces thereof. More specifically, the tetra-amide is heated, in one embodiment to at least about 100° C., in another embodiment to at least about 120° C., and in yet another embodiment to at least about 140° C., and in one embodiment to no more than about 200° C., in another embodiment to no more than about 150° C., and in yet another embodiment to no more than about 140° C., although the temperature can be outside of these ranges.

Thereafter, the pigment particles having oxygen-containing functional groups on the surfaces thereof are admixed with the molten tetra-amide, in relative amounts in one embodiment of at least about 2 parts by weight of tetra-amide per every one part by weight of pigment particles, in another embodiment of at least about 5 parts by weight of tetra-amide per every one part by weight of pigment particles, and in yet another embodiment of at least about 10 parts by weight of tetra-amide per every one part by weight of pigment particles, and in one embodiment of no more than about 20 parts by weight of tetra-amide per every one part by weight of pigment particles, and in another embodiment of no more than about 10 parts by weight of tetra-amide per every one part by weight of pigment particles, although the relative amounts can be outside of these ranges.

Thereafter, the mixture of pigment and tetra-amide is maintained at an elevated temperature, in one embodiment of at least about 100° C., in another embodiment of at least about 120° C., and in yet another embodiment of at least about 140° C., and in one embodiment of no more than about 200° C., in another embodiment of no more than about 150° C., and in yet another embodiment of no more than about 140° C., although the temperature can be outside of these ranges. It should be noted that, while the temperature is "maintained" at elevated temperature, this temperature need not be the same as the temperature to which the tetra-amide was originally raised, and can be either higher or lower than the original temperature to which the tetra-amide was raised. The mixture is maintained at an elevated temperature for a period sufficient to enable the molten tetra-amide to wet the pigment particle surfaces, in one embodiment at least about 0.5 hour, in another embodiment at least about 1 hour, in another embodiment at least about 2 hours, in still another embodiment at least about 5 hours, and in yet still another embodiment at least about 10 hours, and in one embodiment for no more than about 24 hours, and in another embodiment for no more than about 18 hours, and in another embodiment for no more than about 12 hours, although the period of time can be outside of these ranges.

While not required, optionally, the mixture can be agitated at this point, with, for example, a high shear mixer, for a period of in one embodiment at least about 1 minute, and in another embodiment at least about 2 minutes, and in one embodiment no more than about 30 minutes, and in another embodiment no more than about 3 minutes, although the time can be outside of these ranges. High shear conditions can be imposed upon the mixture by any desired or effective method, such as by use of a media mill, such as a Buhler media mill, an attritor, such as a Dispermat attritor, a microfluidizer, an impact homogenizer at high pressure (for example, about 10,000 psi in a confined chamber), including homogenizers made by Brinkman/KINEMATICA of Westbury, N.Y., such as the models PT 1200C, PT 1200CL, PT 10/35, PT2100, PT 1300D, PT 3100, PT 6100, and PT 1200B, a rotor/stator type high shear mixer, such as those commercially available from IKA, Wilmington, N.C., including the IKA Model UTC 65, the IKA Model UTC T 115 KT, the IKA Ultra-Turrax T8, the IKA Ultra-Turrax T25, the IKA Ultra-Turrax UTL 25, the IKA Ultra-Turrax T50, and the IKA T 65D, those commercially available from Quadro, such as the Quadro Model Y2, high shear mixers such as those made by Charles Ross & Son Company of Hauppauge, N.Y., and the like. In one specific embodiment, the high shear mixer is a rotor/stator type mixer operating with a tip speed in one embodiment of at least about 7 meters per second, and in another embodiment of at least about 12 meters per second, and in one embodiment of no more than about 30 meters per second, and in another embodiment of no more than about 25 meters per second, although the tip speed can be outside of these ranges. In one specific embodiment, the high shear mixer is a rotor/stator type mixer operating at a rate of in one embodiment at least about 1,000 rpm, in another embodiment at least about 5,000 rpm, and in yet another embodiment at least about 7,500 rpm, and in one embodiment no more than about 20,000 rpm, in another embodiment no more than about 15,000 rpm, and in yet another embodiment no more than about 12,500 rpm, although the rate can be outside of these ranges.

In one specific embodiment, the shear rate to which the ink ingredients are subjected is in one embodiment at least about 5,000 s$^{-1}$, and in another embodiment is no more than about 15,000 s$^{-1}$, although the shear rate can be outside of these ranges. Shear rate (s$^{-1}$) is defined as the relative velocity between two surfaces (meters per second) divided by the gap distance between them (meters). For example, if a rotor/stator type high shear mixer is used with a tip speed of from about 10 to about 30 meters per second and the gap between the rotor and stator is 2 millimeters (0.002 meters), the shear rate is from about 5,000 to about 15,000 s$^{-1}$. In one specific embodiment, the shear stress to which the ink ingredients are subjected is at least about 50 kilograms per meter, and in another embodiment is no more than about 150 kilograms per meter, although the shear stress can be outside of these ranges. Shear stress is defined as the product of the shear rate and the viscosity; for example, if the viscosity of the ink ingredients at a given temperature (for example, about 140° C.) is about 10 centipoise (0.01 kilograms per meter-second), the shear stress for a shear rate of from about 5,000 to about 15,000 s$^{-1}$ will be from about 50 to about 150 kilograms per meter.

Thereafter, the monoamide is added to the mixture of tetra-amide and pigment. The temperature of the mixture during this addition is in one embodiment at least about 100° C. In another embodiment at least about 120° C., and in yet another embodiment at least about 140° C., and in one embodiment no more than about 200° C., in another embodiment no more than about 150° C., and in yet another embodiment no more than about 140° C., although the temperature can be outside of these ranges. It should be noted that the temperature during this addition need not be the same at which the mixture was previously maintained. In one specific embodiment, the temperature of the mixture can be lowered slightly during the addition to minimize the possibility of aggregation of ink ingredients.

The monoamide is added to the mixture in any desired or effective amount, in one embodiment at least about 2 parts by weight of monoamide per every one part by weight of pigment particles, in another embodiment at least about 6 parts by weight of monoamide per every one part by weight of pigment particles, and in yet another embodiment at least about 10 parts by weight of monoamide per every one part by weight of pigment particles, and in one embodiment no more than about 20 parts by weight of monoamide per every one part by weight of pigment particles, in another embodiment no more than about 12 parts by weight of monoamide per every one part by weight of pigment particles, and in yet another embodiment no more than about 10 parts by weight of monoamide per every one part by weight of pigment particles, although the relative amounts can be outside of these ranges.

Thereafter, the mixture containing the tetra-amide, the pigment particles, and the monoamide is subjected to high shear mixing. For purposes of the present discussion, "high shear" refers to sufficient energy to enable inks containing the pigment particles, tetra-amide, and monoamide to exhibit reduced formation of large agglomerates of pigment particles in the ink compared to inks of the same composition subjected to similar conditions but without high shear mixing of the mixture of pigment particles, tetra-amide, and monoamide as disclosed herein. High shear mixing can be carried out for any desired or effective period of time. In one embodiment at least about 1 minute, and in another embodiment at least about 2 minutes, and in one embodiment no more than about 30 minutes, and in another embodiment no more than about 3 minutes, although the time can be outside of these ranges. High shear conditions can be imposed upon the mixture by any desired or effective method, such as by use of a media mill, a microfluidizer, an impact homogenizer at high pressure, including homogenizers made by Brinkman/KINEMATICA of Westbury, N.Y., such as the models PT 1200C, PT 1200CL, PT 10/35, PT2100, PT 1300D, PT 3100, PT 6100, and PT 1200B, a rotor/stator type high shear mixer, such as those commercially available from IKA, Wilmington, N.C., including the IKA Model UTC 65, the IKA Model UTC T 115 KT, the IKA Ultra-Turrax T8, the IKA Ultra-Turrax T25, the IKA Ultra-Turrax UTL 25, the IKA Ultra-Turrax T50, and the IKA T 65D, those commercially available from Quadro, such as the Quadro Model Y2, high shear mixers such as those made by Charles Ross & Son Company of Hauppauge, N.Y., and the like. In one specific embodiment, the high shear mixer is a rotor/stator type mixer operating with a tip speed in one embodiment of at least about 7 meters per second, and in another embodiment of at least about 12 meters per second, and in one embodiment of no more than about 30 meters per second, and in another embodiment of no more than about 25 meters per second, although the tip speed can be outside of these ranges. In one specific embodiment, the high shear mixer is a rotor/stator type mixer operating at a rate of in one embodiment at least about 1,000 rpm, in another embodiment at least about 5,000 rpm, and in yet another embodiment at least about 7,500 rpm, and in one embodiment no more than about 20,000 rpm, in another embodiment no more than about 15,000 rpm, and in yet another embodiment no more than about 12,500 rpm, although the rate can be outside of these ranges.

Subsequently, optionally, if desired, the mixture containing the tetra-amide, the pigment particles, and the monoamide can be allowed to cool to room temperature or any other desired temperature, at which point the mixture typically (although not necessarily) is a solid; the mixture can then be subsequently reheated for admixture with any other ink ingredients. Alternatively, other ink ingredients can be admixed with the mixture while the mixture is still at an elevated temperature.

If it is desired to have any additional ingredients in the ink, they are admixed with the mixture of pigment particles, tetra-amide, and monoamide previously prepared. Additional ingredients can include both materials different from those already in the pigment mixture and additional amounts of materials, such as the tetra-amide and/or monoamide, already present in the pigment mixture. If the mixture of pigment particles, tetra-amide, and monoamide was previously cooled, this mixture and the additional ink ingredients are heated, in one embodiment to at least about 120° C., in another embodiment to at least about 130° C., and in yet another embodiment to at least about 140° C., and in one embodiment to no more than about 170° C., in another embodiment to no more than about 150° C. and in yet another embodiment to no more than about 140° C., although the temperature can be outside of these ranges. At this point, the mixture containing all of the desired ink ingredients can be stirred with, for example, a magnetic stirrer, overhead stirrer, or the like, until a homogeneous ink composition is obtained, followed by cooling the ink to ambient temperature (typically from about 20 to about 25° C.). The inks are solid at ambient temperature.

The ink compositions have melting points in one embodiment no lower than about 50° C., in another embodiment no lower than about 70° C., and in yet another embodiment no lower than about 80° C., and have melting points in one embodiment no higher than about 160° C., in another embodiment no higher than about 140° C., and in yet another embodiment no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., in another embodiment no higher than about 150° C., and in yet another embodiment no higher than about 130° C., although the jetting temperature can be outside of these ranges) in one embodiment of no more than about 30 centipoise, in another embodiment no more than about 20 centipoise, and in yet another embodiment no more than about 15 centipoise, and in one embodiment of no less than about 2 centipoise, in another embodiment no less than about 5 centipoise, and in yet another embodiment no less than about 7 centipoise, although the melt viscosity can be outside of these ranges.

The inks can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In one specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. The inks can also be employed in other hot melt printing processes, such as hot melt acoustic ink jet printing, hot melt thermal ink jet printing, hot melt continuous stream or deflection ink jet printing, or the like. Phase change inks can also be used in printing processes other than hot melt ink jet printing processes, such as hot melt gravure printing, hot melt medical imaging printing, or the like.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

Another embodiment is directed to an ink set comprising (1) a first ink comprising pigment particles having oxygen-containing functional groups on the surfaces thereof and a first ink carrier comprising a monoamide and a tetra-amide, and (2) a second ink comprising a dye colorant and a second ink carrier comprising the monoamide, the tetra-amide, wherein the first ink carrier contains substantially the same components as the second ink carrier. By "wherein the first ink carrier contains substantially the same components as the second ink carrier" is meant that the two carriers contain substantially the same components, although the amounts of the components in each carrier can differ. By "substantially the same components" is meant that the tetra-amide, the monoamide, and any additional optional ink ingredients are of the same composition in the first and second ink carriers. Because of the high quality of the dispersion of pigment particles in the ink carrier, no additional surfactants are needed or present for the purpose of enhancing pigment dispersion in this specific embodiment.

Examples of suitable dyes for the second ink include Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF): Orasol Red G (Ciba-Geigy); Direct Brilliant Pink B (Crompton & Knowles); Aizen Spilon Red C-BH (Hodogaya Chemical); Kayanol Red 3BL (Nippon Kayaku): Levanol Brilliant Red 3BW (Mobay Chemical), Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy):

Orasol Black RLP (Ciba-Geigy); Savinyl Black RLS (Sandoz): Dermacarbon 2GT (Sandoz); Pyrazol Black BG (ICI); Morfast Black Conc. A (Morton-Thiokol); Dlaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF), Intratherm Yellow 346 from Crompton and Knowles, C.I. Disperse Yellow 238, Neptune Red Base NB543 (BASF, C.I. Solvent Red 49). Neopen Blue FF-4012 from BASF, Lampronol Black BR from iCI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken ink Yellow 869, Milliken ink Blue 92, Milliken ink Red 357, Milliken ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable as dyes for the second ink are the colorants disclosed in U.S. Pat. No. 6,472,523, Copending application U.S. Ser. No. 10/072,210, filed Feb. 8, 2002, entitled "Ink Compositions Containing Phthalocyanines," U.S. Pat. No. 6,476,219, U.S. Pat. No. 6,576,747, Copending application U.S. Ser. No. 10/185,994, filed Jun. 27, 2002, entitled "Dimeric Azo Pyridone Colorants," Copending application U.S. Ser. No. 10/184,269, filed Jun. 27, 2002, entitled "Phase Change inks Containing Dimeric Azo Pyridone Colorants," Copending application U.S. Ser. No. 10/185, 264, filed Jun. 27, 2002, entitled "Phase Change Inks Containing Azo Pyridone Colorants," U.S. Pat. No. 6,590, 082, Copending application U.S. Ser. No. 10/185,597, filed Jun. 27, 2002, entitled "Process for Preparing Substituted Pyridone Compounds," U.S. Pat. No. 6,576,748, U.S. Pat. No. 6,646,111, Copending application U.S. Ser. No. 10/184, 266, filed Jun. 27, 2002, entitled "Phase Change inks Containing Dimeric Azo Pyridone Colorants," Copending application U.S. Ser. No. 10/260,146, filed Sep. 27, 2002, entitled "Colorant Compounds," with the named inventors Jeffery H. Banning and C. Wayne Jaeger, and Copending application U.S. Ser. No. 10/260,379, filed Sep. 27, 2002, entitled "Methods for Making Colorant Compounds," with the named inventors C. Wayne Jaeger and Jeffery H. Banning, the disclosures of each of which are totally incorporated herein by reference.

Other ink colors besides the subtractive primary colors can be desirable for applications such as postal marking or industrial marking and labelling using phase change printing, and the second ink can also contain such dyes. Further, infrared (IR) or ultraviolet (UV) absorbing dyes can also be incorporated into the second inks for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265. U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

The dye is present in the second ink in any desired or effective amount to obtain the desired color or hue, in one embodiment at least about 0.1 percent by weight of the ink. In another embodiment at least about 0.2 percent by weight of the ink, and in yet another embodiment at least about 0.5 percent by weight of the ink, and in one embodiment no more than about 50 percent by weight of the ink, in another embodiment no more than about 20 percent by weight of the ink, and in yet another embodiment no more than about 10 percent by weight of the ink, although the amount can be outside of these ranges.

The second ink compositions can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks are solid at ambient temperature.

Specific embodiments will now be described in detail. These examples are intended to be illustrative, and the invention is not limited to the materials, conditions, or process parameters set forth in these embodiments. All parts and percentages are by weight unless otherwise indicated.

EXAMPLE I

Preparation of Preblend of SPECIAL BLACK 4

To a 250 milliliter beaker was added 10.00 grams of SPECIAL BLACK 4 pigment (obtained from Degussa) and 44.65 grams of a tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference. The beaker was then placed in an oven for 18 hours at a temperature of 140° C. Subsequently, the beaker was removed from the oven and quickly stirred with a spatula while in the melt state to give a homogeneous dispersion of coarse carbon black particles wetted with the tetra-amide resin. Stearyl stearamide wax (KEMAMIDE S-180, obtained from Witco, 60.65 grams) was then added and the dispersion was further heated in an oven at a temperature of 140° C. until the mixture was molten (about 2 hours). The beaker was then removed from the oven and the molten mixture was immediately blended with a high shear mixer (POLYTRON, model 15/40, obtained from Brinkmann instruments inc., Westbury, N.Y.) for 3 minutes at 10,000 rpm. The resulting preblend was poured into an aluminum pan and allowed to cool to room temperature.

EXAMPLES II TO XI

Preparation of Preblends of Additional Pigments

The process of Example I was used to prepare five additional preblends in which the SPECIAL BLACK 4 was substituted with an identical amount (10 grams) of the following respective carbon black pigments:
Example II: NIPEX 150, obtained from Degussa
Example III: MA77, obtained from Mitsubishi
Example IV: MA100S, obtained from Mitsubishi Example V: RAVEN 2500 ULTRA, obtained from Columbia
Example VI: MONARCH 900, obtained from Cabot
Example VII: SPECIAL BLACK 350, obtained from Degussa
Example VIII: SPECIAL BLACK 100, obtained from Degussa
Example IX: MOGUL L, obtained from Cabot
Example X: REGAL 400R, obtained from Cabot
Example XI: PRINTEX 150T, obtained from Degussa

EXAMPLE XII

Preparation of Phase Change Ink from Preblend of Example I

To a 250 milliliter beaker was added, in the stated order, 50 grams of the preblend prepared in Example I, 14.35 grams of a urethane resin obtained from the reaction of two equivalents of ABITOL® E hydroabietyl alcohol (obtained from Hercules inc., Wilmington, Del.) and one equivalent of isophorone diisocyanate, prepared as described in Example 1 of U.S. Pat. No. 5,782,966, the disclosure of which is totally incorporated herein by reference, 6.08 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference, 51.01 grams of polyethylene wax (POLYWAX 655, obtained from Baker Petrolite, of the formula $CH_3(CH_2)_{50}CH_3$)), and 0.024 grams of NAUGARD N445 antioxidant, obtained from Uniroyal Chemical Co., Middlebury, Conn. The mixture was then placed in an oven at 140° C. for a period of 5 hours to melt fully each of the components. The molten mixture was then removed from the oven and mixed with a mechanical stirrer for 3 minutes at 400 rpm. The resulting ink was finally transferred from the beaker to an aluminum pan to cool to room temperature.

EXAMPLES XIII TO XXII

Preparation of Phase Chance Inks from Preblends of Examples II to XI

The process of Example XII was used to prepare five additional inks in which the preblend of Example I was substituted with an identical amount (50 grams) of the preblends from Examples II through XI:
Example XIII: preblend of Example II
Example XIV: preblend of Example III
Example XV: preblend of Example IV
Example XVI: preblend of Example V
Example XVII: preblend of Example VI
Example XVIII: preblend of Example VII
Example XIX: preblend of Example VIII
Example XX: preblend of Example IX
Example XXI: preblend of Example X
Example XXII: preblend of Example XI

COMPARATIVE EXAMPLE A

Preparation of Preblend of SPECIAL BLACK 4

To a 250 milliliter beaker was added 10.00 grams of SPECIAL BLACK 4 obtained from Degussa, 60.65 grams of KEMAMIDE S-180 obtained from Witco, 44.65 grams of a tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 33.15 grams of a urethane resin obtained from the reaction of two equivalents of ABITOL® E hydroobietyl alcohol (obtained from Hercules inc., Wilmington, Del.) and one equivalent of isophorone diisocyanate, prepared as described in Example 1 of U.S. Pat. No. 5,782,966, the disclosure of which is totally incorporated herein by reference, and 14.04 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference. The beaker was then placed in an oven for about 4 hours at a temperature of 140° C. Subsequently, the beaker was removed from the oven and the molten mixture was immediately blended with a high shear mixer (POLYTRON, model 15/40, obtained from Brinkmann instruments inc., Westbury, N.Y.) for 3 minutes at 10,000 rpm. The resulting preblend was poured into an aluminum pan and allowed to cool to room temperature.

COMPARATIVE EXAMPLES B THROUGH L

Preparation of Preblends of Additional Pigments

The process of Comparative Example A was used to prepare five additional preblends in which the SPECIAL BLACK 4 was substituted with an identical amount (10 grams) of the following respective carbon black pigments:
Comparative Example B: NIPEX 150, Degussa
Comparative Example C: MA77, Mitsubishi
Comparative Example D: MA100S, Mitsubishi
Comparative Example E: RAVEN 2500 ULTRA, Columbia
Comparative Example F: MONARCH 900, Cabot
Comparative Example G: SPECIAL BLACK 350, Degussa
Comparative Example H: SPECIAL BLACK 100, Degussa
Comparative Example J: MOGUL L, Cabot
Comparative Example K: REGAL 400R, Cabot
Comparative Example L: PRINTEX 150T, Degussa

COMPARATIVE EXAMPLE M

Preparation of Phase Change Ink from Preblend of Comparative Example A

To a 250 milliliter beaker was added, in the order stated, 60 grams of the preblend prepared in Comparative Example A, 43,47 grams of polyethylene wax (POLYWAX 655, obtained from Baker Petrolite, of the formula $CH_3(CH_2)_{50}CH_3$)), and 0.024 grams of NAUGARD N445 antioxidant, obtained from Uniroyal Chemical Co., Middlebury, Conn. The mixture was then placed in an oven at 140° C. for a period of 5 hours to melt fully each of the components. The molten mixture was then removed from the oven and mixed with a mechanical stirrer for 3 minutes at 400 rpm. The resulting ink was finally transferred from the beaker to an aluminum pan to cool to room temperature.

COMPARATIVE EXAMPLES N THROUGH W

Preparation of Phase Change Inks from Preblends of Comparative Examples B to L

The process of Comparative Example M was used to prepare five additional inks in which the preblend of Comparative Example A was substituted with an identical amount (60 grams) of the preblends from Comparative Examples B through K:

Comparative Example N: preblend of Comparative Example B

Comparative Example O: preblend of Comparative Example C

Comparative Example P: preblend of Comparative Example D

Comparative Example Q: preblend of Comparative Example E

Comparative Example R: preblend of Comparative Example F

Comparative Example S: preblend of Comparative Example G

Comparative Example T: preblend of Comparative Example H

Comparative Example U: preblend of Comparative Example J

Comparative Example V: preblend of Comparative Example K

Comparative Example W: preblend of Comparative Example L

The inks thus prepared were placed between two microscope slides, heated on a heated microscope stage to 135° C., and examined with a Zeiss Axioplan optical microscope equipped with Linkam Scientific instruments (Surrey, UK) LTS350 heating/freezing stage and a TMS 93 programmer at about 150× magnification. The inks were rated for the quality of the pigment dispersion therein on a scale as follows:

1: no visible particles
2: pigment well dispersed with a few particle aggregates of less than 10 microns volume average particle size
3: majority of pigment is well dispersed but some agglomerates of less than 25 microns volume average particle size appear
4: two phase system with both well dispersed and poorly dispersed pigment
5: two phase system with separate ink vehicle and pigment domains

| Pigment | Example | Rating | Comparative Example | Rating |
|---|---|---|---|---|
| SPECIAL BLACK 4 | XII | 2 | M | 3 |
| NIPEX 150 | XIII | 2 | N | 3 |
| MA77 | XIV | 3 | O | 5 |
| MA100S | XV | 2–3 | P | 3–4 |
| RAVEN 2500 ULTRA | XVI | 2–3 | Q | 4 |
| MONARCH 900 | XVII | 4 | R | 4 |
| SPECIAL BLACK 350 | XVIII | 2–3 | S | 5 |
| SPECIAL BLACK 100 | XIX | 3 | T | 4–5 |
| MOGUL L | XX | 2–3 | U | 5 |
| REGAL 400R | XXI | 2–3 | V | 4–5 |
| PRINTEX 150T | XXII | 2–3 | W | 4–5 |

Other embodiments and modifications may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) an ink carrier comprising a monoamide and a tetra-amide, and (b) oxidized pigment particles, said pigment particles having oxygen-containing functional groups on the surfaces thereof.

2. An ink according to claim 1 wherein the monoamide is stearamide, behenamide, oleamide, erucamide, behenyl behenamide, stearyl stearamide, stearyl erucamide, erucyl erucamide, oleyl palmitamide, erucyl stearamide, or mixtures thereof.

3. An ink according to claim 1 wherein the monoamide is of the formula

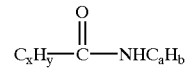

wherein x is an integer of from about 5 to about 21, y is an integer of from about 11 to about 43, a is an integer of from about 6 to about 22, and b is an integer of from about 13 to about 45.

4. An ink according to claim 1 wherein the monoamide is present in the ink carrier in an amount of at least about 8 percent by weight.

5. An ink according to claim 1 wherein the monoamide is present in the ink carrier in an amount of no more than about 32 percent by weight.

6. A phase change ink composition comprising (a) an ink carrier comprising a monoamide and a tetra-amide, and (b) pigment particles having oxygen-containing functional groups on the surfaces thereof, wherein the tetra-amide is of the formula

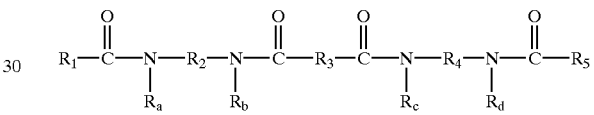

wherein $R_a$, $R_b$, $R_c$, and $R_d$ each, independently of the others, is (a) a hydrogen atom, (b) an alkyl group, (c) an aryl group, (d) an arylalkyl group, or (e) an alkylaryl group, wherein $R_2$, $R_3$, and $R_4$ each, independently of the others, are (a) an alkylene group, (b) on arylene group, (c) an arylalkylene group, or (d) an alkylarylene group, and wherein $R_1$ and $R_5$ each, independently of the other, is (a) an alkyl group, (b) on aryl group, (c) an arylalkyl group, or (d) an alkylaryl group.

7. An ink according to claim 6 wherein at least one of the alkyl, alkylene, aryl, arylene, arylalkyl, arylalkylene, alkylaryl, and alkylarylene groups is substituted.

8. An ink according to claim 6 wherein none of the alkyl, arylene, aryl, arylene, arylalkyl, arylalkylene, alkylaryl, and alkylarylene groups are substituted.

9. An ink according to claim 6 wherein at least one of the alkyl, alkylene, aryl, arylene, arylalkyl, arylalkylene, alkylaryl, and alkylarylene groups has at least one hetero atom therein.

10. An ink according to claim 9 wherein the one or more hetero atom is oxygen, nitrogen, sulfur, silicon, phosphorus, or a mixture thereof.

11. An ink according to claim 6 wherein none of the alkyl, alkylene, aryl, arylene, arylalkyl, arylalkylene, alkylaryl, and alkylarylene groups have hetero atoms therein.

12. An ink according to claim 6 wherein $R_1$ is an alkyl group with about 18 carbon atoms.

13. An ink according to claim 6 wherein $R_1$ and $R_5$ are each alkyl groups with about 18 carbon atoms.

14. An ink according to claim 6 wherein $R_1$ is an alkyl group with at least about 37 carbon atoms.

15. An ink according to claim 6 wherein $R_1$ and $R_5$ are each alkyl groups with at least about 37 carbon atoms.

16. An ink according to claim 6 wherein $R_1$ is an alkyl group with about 48 carbon atoms.

17. An ink according to claim 6 wherein $R_1$ and $R_5$ are each alkyl groups with about 48 carbon atoms.

18. An ink according to claim 6 wherein $R_1$ and $R_6$ are both —(CH$_2$)$_{16}$CH$_3$, $R_2$ and $R_4$ are each —CH$_2$CH$_2$—, and $R_3$ is a branched unsubstituted alkyl group having about 34 carbon atoms.

19. An ink according to claim 6 wherein $R_1$ and $R_5$ are both —(CH$_2$)$_n$CH$_3$ wherein n is 47 or 48, $R_2$ and $R_4$ are each —CH$_2$CH$_2$—, and $R_3$ is a branched unsubstituted alkyl group having about 34 carbon atoms.

20. An ink according to claim 1 wherein the tetra-amide is present in the ink carrier in on amount of at least about 10 percent by weight.

21. An ink according to claim 1 wherein the tetra amide is present in the ink carrier in an amount of no more than about 32 percent by weight.

22. A phase change ink composition comprising (a) an ink carrier comprising a monoamide and a tetra-amide, and (b) pigment particles having oxygen-containing functional groups on the surfaces thereof, said ink further comprising a urethane.

23. An ink according to claim 22 wherein the urethane is derived from the reaction of two equivalents of hydroabietyl alcohol and one equivalent of isophorone diisocyanate.

24. A phase change ink composition comprising (a) an ink carrier comprising a monoamide and a tetra-amide, and (b) pigment particles having oxygen-containing functional groups on the surfaces thereof, said ink further comprising an isocyanate derived material that is the adduct of three equivalents of stearyl isocyanate and a glycerol propoxylate.

25. An ink according to claim 24 wherein the isocyanate-derived material is the product of the reaction of about 1.5 parts hydroabietyl alcohol, about 0.5 port octadecyl amine, and about 1 part isophorone diisocyanate.

26. A phase change ink composition comprising (a) an ink carrier comprising a monoamide and a tetra-amide, and (b) pigment particles having oxygen-containing functional groups on the surfaces thereof, wherein the monoamide is stearyl stearamide, is present in the carrier in an amount of at least about 8 percent by weight and is present in the carrier in an amount of no more than about 50 percent by weight, wherein the tetra-amide is a dimer acid based tetra-amide that is the reaction product of dimer acid, ethylene diamine, and a long chain hydrocarbon having greater than thirty six carbon atoms and having a terminal carboxylic acid group, is present in the carrier in an amount of at least about 10 percent by weight, and is present in the carrier in on amount of no more than about 32 percent by weight, said ink further comprising (1) a polyethylene wax, present in the carrier in an amount of at least about 25 percent by weight, and present in the carrier in an amount of no more than about 60 percent by weight, (2) a urethane resin derived from the reaction of two equivalents of hydroabiety alcohol and one equivalent of isophorone diisocyanate, present in the carrier in an amount of at least about 6 percent by weight, and present in the carrier in an amount of no more than about 16 percent by weight, (3) a urethane resin that is the adduct of three equivalents of stearyl isocyanate and a glycerol-based alcohol, present in the carrier in an amount of at least about 2 percent by weight, and present in the carrier in an amount of no more than about 13 percent by weight, and (4) an antioxidant, present in the carrier in on amount of at least about 0.01 percent by weight, and present in the carrier in an amount of no more than about 1 percent by weight.

27. A phase change ink composition comprising (a) an ink carrier comprising a monoamide and a tetra-amide, and (b) pigment particles having oxygen-containing functional groups on the surfaces thereof, said ink further comprising a polyethylene wax.

28. An ink according to claim 1 wherein the oxygen-containing functional groups on the surfaces of the pigment particles are acidic oxygen-containing functional groups.

29. An ink according to claim 1 wherein the oxygen-containing functional groups on the surfaces of the pigment particles are basic oxygen-containing functional groups.

30. An ink according to claim 1 wherein the oxygen-containing functional groups on the surfaces of the pigment particles are carboxylic acid groups, sulfonic acid groups, phosphonic acid groups, hydroxyl groups, phenolic hydroxyl groups, quinonic groups, lactonic groups, or mixtures thereof.

31. A phase change ink composition comprising (a) an ink carrier comprising a monoamide and a tetra-amide, and (b) placement particles having oxygen-containing functional groups on the surfaces thereof, wherein the pigment particles have a primary volume average particle size of no more than about 0.5 micron.

32. An ink according to claim 31 wherein the pigment particles have a primary volume average particle size of no more than about 0.2 micron.

33. An ink according to claim 31 wherein the pigment particles have a primary volume average particle size of no more than about 0.12 micron.

34. An ink according to claim 1 wherein the pigment particles are present in the ink in an amount of at least about 0.1 percent by weight of the ink.

35. An ink according to claim 1 wherein the pigment particles are present in the ink in an amount of no more than about 20 percent by weight of the ink.

36. An ink according to claim 1, said ink being substantially free of surfactants and pigment dispersing agents.

37. A process for preparing a phase change ink which comprises (a) melting a tetra-amide which is solid at about 25° C.; (b) admixing with the molten tetra-amide pigment particles having oxygen-containing functional groups on the surfaces thereof: (c) maintaining the mixture of pigment and tetra-amide at a temperature of at least about 100° C. and at a temperature of no more than about 200° C. for a period sufficient to enable the molten tetra-amide to wet the pigment particle surfaces; (d) subsequent to wetting of the pigment particle surfaces with the molten tetra-amide, adding to the mixture a monoamide; (e) subsequent to addition of the monoamide, subjecting the resulting mixture to high shear mixing; and (f) subsequent to subjecting the mixture to high shear mixing, optionally adding to the mixture additional ink ingredients.

38. A process according to claim 37 wherein the mixture of pigment and tetra-amide is maintained at a temperature of at least about 120° C. for a period sufficient to enable the molten tetra-amide to wet the pigment particle surfaces.

39. A process according to claim 37 wherein the mixture of pigment and tetra-amide is maintained at a temperature of at least about 140° C. for a period sufficient to enable the molten tetra-amide to wet the pigment particle surfaces.

40. A process according to claim 37 wherein the mixture of pigment and tetra-amide is maintained at a temperature of no more than about 150° C. for a period sufficient to enable the molten tetra-amide to wet the pigment particle surfaces.

41. A process according to claim 37 wherein the mixture of pigment and tetra-amide is maintained at a temperature of no more than about 140° C. for a period sufficient to enable the molten tetra-amide to wet the pigment particle surfaces.

42. A process according to claim 37 wherein the period sufficient to enable the molten tetra-amide to wet the pigment particle surfaces is at least about 0.5 hour.

43. A process according to claim 37 wherein the period sufficient to enable the molten tetra-amide to wet the pigment particle surfaces is at least about 1 hour.

44. A process according to claim 37 wherein the period sufficient to enable the molten tetra-amide to wet the pigment particle surfaces is at least about 2 hours.

45. A process according to claim 37 wherein the period sufficient to enable the molten tetra-amide to wet the pigment particle surfaces is at least about 5 hours.

46. A process according to claim 37 wherein the period sufficient to enable the molten tetra-amide to wet the pigment particle surfaces is at least about 10 hours.

47. A process according to claim 37 wherein the mixture of pigment particles and tetra-amide is subjected to high shear mixing prior to addition of the monoamide.

48. A process according to claim 37 wherein the mixture of pigment particles, monoamide, and tetra-amide is subjected to high shear mixing at a rate of at least about 1,000 rpm.

49. A process according to claim 37 wherein the mixture of pigment particles, monoamide, and tetra-amide is subjected to high shear mixing at a rate of at least about 5,000 rpm.

50. A process according to claim 37 wherein the mixture of pigment particles, monoamide, and tetra-amide is subjected to high shear mixing at a rate of at least about 7,500 rpm.

51. A process according to claim 37 wherein the mixture of pigment particles, monoamide, and tetra-amide is subjected to high shear mixing at a rate of no more than about 20,000 rpm.

52. A process according to claim 37 wherein the mixture of pigment particles, monoamide, and tetra-amide is subjected to high shear mixing at a rate of no more than about 15,000 rpm.

53. A process according to claim 37 wherein the mixture of pigment particles, monoamide, and tetra-amide is subjected to high shear mixing at a rate of no more than about 12,500 rpm.

54. A process according to claim 37 wherein the mixture of pigment particles, monoamide, and tetra-amide is subjected to high shear mixing at a tip speed of at least about 7 meters per second.

55. A process according to claim 37 wherein the mixture of pigment particles, monoamide, and tetra-amide is subjected to high shear mixing at a tip speed of at least about 12 meters per second.

56. A process according to claim 37 wherein the mixture of pigment particles, monoamide, and tetra-amide is subjected to high shear mixing at a tip speed of no more than about 30 meters per second.

57. A process according to claim 37 wherein the mixture of pigment particles, monoamide, and tetra-amide is subjected to high shear mixing at a tip speed of no more than about 25 meters per second.

58. A process according to claim 37 wherein subsequent to addition of the monoamide and subjecting the resulting mixture to high shear mixing, a polyethylene wax is added to the mixture.

59. A process according to claim 37 wherein subsequent to addition of the monoamide and subjecting the resulting mixture to high shear mixing, an isocyanate-derived materiel is added to the mixture.

60. A process according to claim 37 wherein substantially no surfactants or dispersing agents are contained in the resulting ink.

61. A phase change ink set comprising (1) a first phase change ink comprising pigment particles having oxygen-containing functional groups on the surfaces thereof and a first ink carrier comprising a monoamide and a tetra-amide, and (2) a second phase change ink comprising a dye colorant and a second ink carrier comprising the monoamide, the tetra-amide, wherein the first ink carrier contains substantially the same components as the second ink carrier.

62. An ink according to claim 1 wherein the oxidized pigment particles are prepared by treating the pigment particles with nitric acid.

63. An ink according to claim 1 wherein the oxidized pigment particles are prepared by treating the pigment particles with ozone.

64. An ink according to claim 1 wherein the oxygen-containing functional groups on the surfaces of the pigment particles are quinonic groups, lactonic groups, or mixtures thereof.

65. A process according to claim 37 wherein the pigment particles are oxidized pigment particles.

66. A process according to claim 65 wherein the oxidized pigment particles ore prepared by treating the pigment particles with nitric acid.

67. A process according to claim 65 wherein the oxidized pigment particles are prepared by treating the pigment particles with ozone.

68. A process according to claim 37 wherein the oxygen-containing functional groups on the surfaces of the pigment particles are quinonic groups, lactonic groups, or mixtures thereof.

69. A phase change ink set according to claim 61 wherein the pigment particles in the first phase change ink are oxidized pigment particles.

70. A phase change ink set according to claim 69 wherein the oxidized pigment particles are prepared by treating the pigment particles with nitric acid.

71. A phase change ink set according to claim 69 wherein the oxidized pigment particles are prepared by treating the pigment particles with ozone.

72. A phase change ink set according to claim 61 wherein the oxygen-containing functional groups on the surfaces of the pigment particles in the first phase change ink are quinonic groups, lactonic groups, or mixtures thereof.

* * * * *